United States Patent [19]
Fletcher et al.

[11] 4,085,004
[45] Apr. 18, 1978

[54] CONTROL FOR NUCLEAR THERMIONIC POWER SOURCE

[76] Inventors: James C. Fletcher, Administrator of the National Aeronautics and Space Administration, with respect to an invention of; Craig D. Sawyer, Los Gatos, Calif.

[21] Appl. No.: 634,214

[22] Filed: Nov. 21, 1975

Related U.S. Application Data

[63] Continuation-in-part of Ser. No. 294,738, Oct. 3, 1972, abandoned.

[51] Int. Cl.² .............................................. G21C 7/00
[52] U.S. Cl. .................................... 176/22; 176/39; 176/33
[58] Field of Search ................. 176/33, 39, 22; 310/4

[56] References Cited

U.S. PATENT DOCUMENTS

| | | | |
|---|---|---|---|
| 3,113,091 | 12/1963 | Rasor et al. | 176/39 |
| 3,259,766 | 7/1966 | Beckford et al. | 176/33 |
| 3,444,400 | 5/1969 | Janner et al. | 176/39 |
| 3,547,778 | 12/1970 | Flaherty et al. | 176/33 |
| 3,613,773 | 10/1971 | Hall et al. | 310/4 |

OTHER PUBLICATIONS

"Improved Control for a Nuclear/Thermionic Power Source-A Concept", by Sawyer, pp. 4–14, (Presented at the 1971 Thermionic Conversion Specialists Conf., Oct. 4–6, 1971, San Diego, Calif.).

*Primary Examiner*—Harvey E. Behrend
*Attorney, Agent, or Firm*—Monte F. Mott; John R. Manning; Paul F. McCaul

[57] ABSTRACT

A control for a power source which includes nuclear fuel interspersed with thermionic converters, including a power regulator that maintains a substantially constant output voltage to a variable load, and a control circuit that drives a neutron flux regulator in accordance with the current supplied to the power regulator and the neutron flux density in the region of the converters. The control circuit generates a control signal which is the difference between the neutron flux density and a linear function of the current, and which drives the neutron regulator in a direction to decrease or increase the neutron flux according to the polarity of the control signal.

6 Claims, 4 Drawing Figures

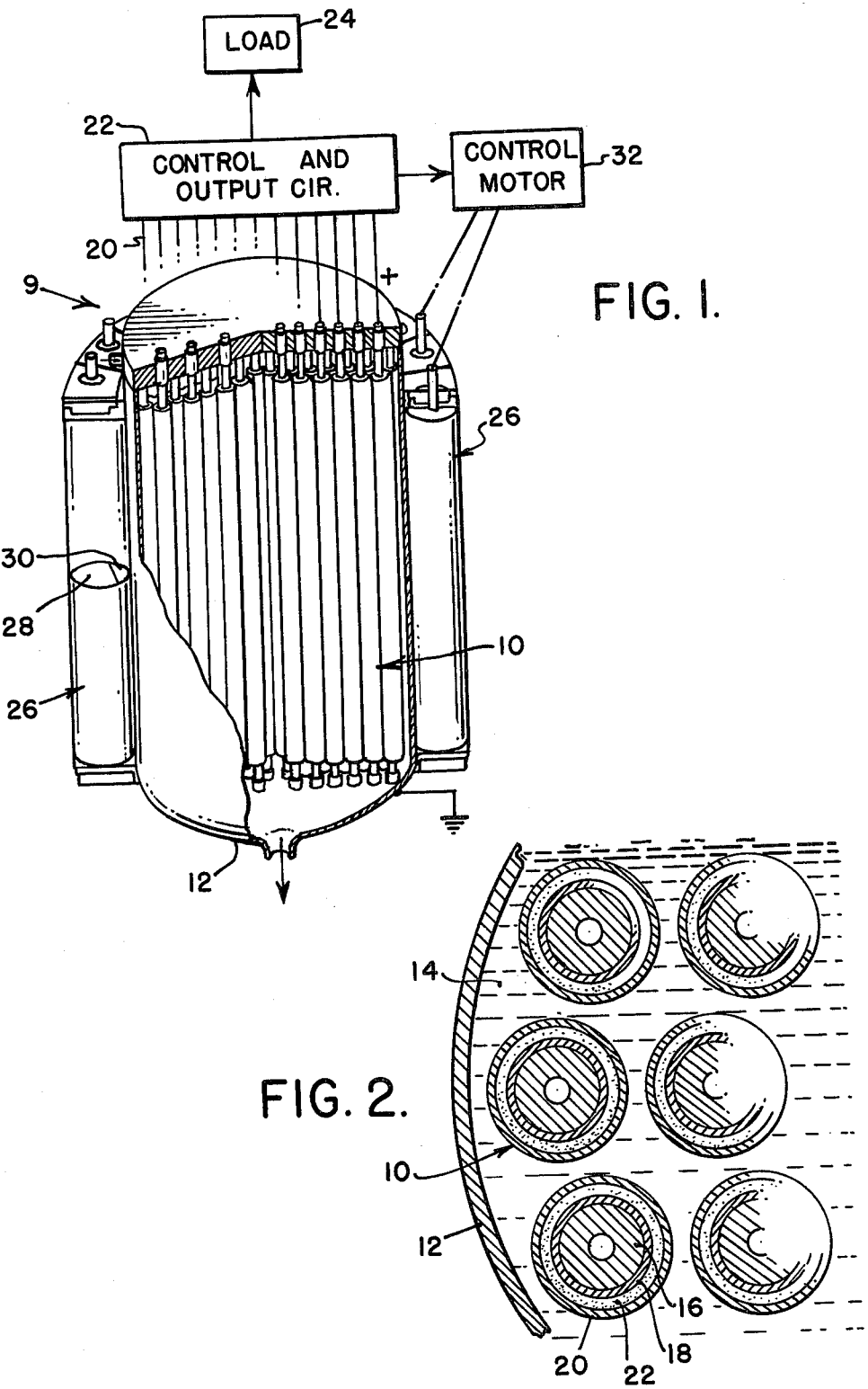

CONTROL FOR NUCLEAR THERMIONIC POWER SOURCE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

REFERENCE TO CORRESPONDING APPLICATIONS

This is a Continuation-in-Part of application Ser. No. 294,738 filed Oct. 3, 1972 now abandoned.

BACKGROUND OF THE INVENTION

This invention relates to nuclear thermionic converter power sources, and more particularly to a control system therefor.

One type of nuclear reactor system which is useful in space vehicles includes an array of units that contain quantities of nuclear fuel and thermionic converters. The fuel heats the emitter of each thermionic converter while a cooling fluid cools the collector, and the temperature difference results in the production of electricity. The electrical load which is connected to the converter outputs sometimes changes rapidly to very different levels. This can lead to wide fluctuations in the voltage supplied to the loads and to wide fluctuations in the temperature of the thermionic emitters, both of which are highly undesirable. Variations in voltage are, of course, undesirable in that they can interfere with proper orientation of equipment energized by the reactor system. Variations in emitter temperature are undesirable because they seriously reduce the lift of the emitters.

Various control systems can be used to govern the operation of the reactor. One possible control scheme is to use dummy loads that are connected or disconnected to compensate for sudden change in real loads, so the reactor always operates at a predetermined point that avoids temperature or voltage fluctuations. However, this requires operation at a maximum neutron flux which reduces the life of the nuclear fuel. Another control scheme involves the comparison of the converter output voltage to a predetermined constant voltage, and the regulation of neutron flux to maintain a constant voltage. While this produces voltage regulation, it results in temperature fluctuations with load, which decreases the life of the thermionic emitters. Still another control scheme involves the use of a variable gain power regulator between the thermionic converters and the load to vary the load voltage, wherein the voltage gain of the regulator is adjusted as a function of thermionic current and neutron flux. Any deviation of the output voltage from a predetermined level is used to control the neutron flux in a direction to reduce the deviation. This system minimizes temperature fluctuations, but results in brief but large fluctuations in output voltage to the load when the load changes suddenly. A control system that minimized both emitter temperature fluctuations and load voltage fluctuations in spite of sudden changes in load would permit the reactor system to operate reliably over long periods while promoting proper operation of the loads.

SUMMARY OF THE INVENTION

In accordance with one embodiment of the present invention, a control system is provided for a thermionic reactor power source which maintains a constant load voltage while minimizing emitter temperature variations, in spite of wide and sudden changes in load. The control system includes a neutron flux control circuit, and a separate variable gain power regulator that provides a constant voltage output to the load. The neutron flux control circuit compares the actual neutron flux to a linear function of current supplied by the thermionic converter of the reactor, and uses any difference as an error signal that drives a mechanism which alters the neutron flux. The variable gain regulator always draws enough current from the thermionic converter to supply the load with a constant voltage.

When the load increases, the variable gain power regulator draws more than a proportional increase in current to make up for the resulting drop in voltage of the thermionic converter. This tends to rapidly drop the temperature of the thermionic emitters, but also permits the power regulator to supply the load without reducing the voltage. Also, the large and rapid increase in current from the emitters results in a large error signal from the neutron flux control circuit, so that it rapidly increases the neutron flux to heat the emitters and prevent a large decrease in emitter temperature. The apparatus functions in a similar manner during load decreases to maintain a relatively stable emitter temperature and load voltage.

BRIEF DESCRIPTION OF THE DRAWINGS

FIG. 1 is a perspective sectional view and block diagram of a power source constructed in accordance with the invention;

FIG. 2 is a partial sectional view of the reactor of FIG. 1;

DESCRIPTION OF THE PREFERRED EMBODIMENTS

Figure 3:
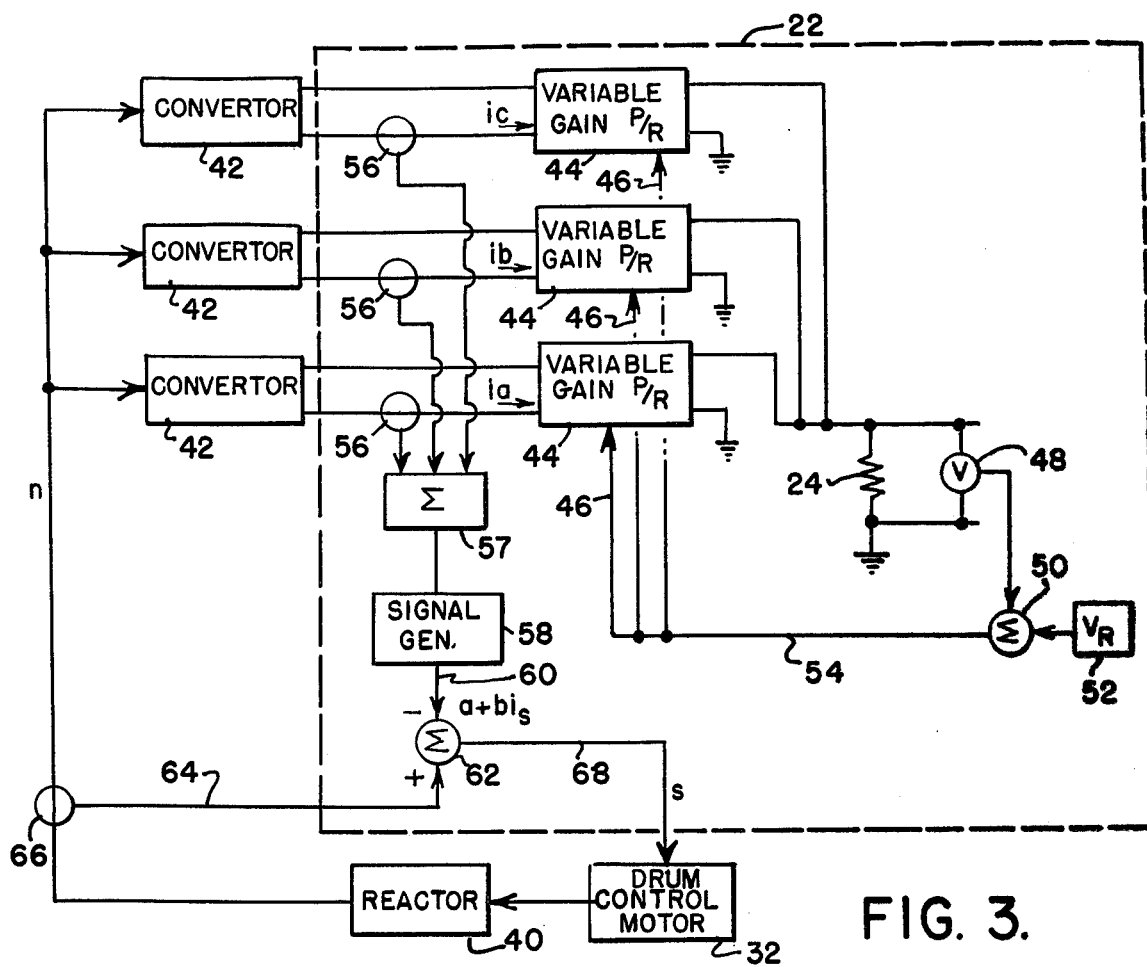
FIG. 3 is a block diagram representation of the power source of FIG. 1.

FIG. 1 illustrates an in-core thermionic reactor system 9 which utilizes an array of power units 10 that are contained in a chamber formed by a vessel 12. Each power unit 10 actually includes several short subunits stacked on one another. As illustrated in FIG. 2, each power subunit includes a core 16 of a nuclear fuel such as enriched uranium, an emitter 18 surrounding the core and in contact with it, a collector 20 surrounding the emitter but spaced from it, and a region 22 between the collector and emitter which is filled with cesium gas. The nuclear fuel in all of the power units is of sufficient mass and packed at sufficient density for the reactor to become critical so that the fuel creates heat. The heat maintains the emitters 18 of the units at a high temperature. A cooling fluid 14 flows through the space between the power units 10 to cool the collectors 20. The difference in temperature between each emitter and collector results in the collector 20 collecting electrons leaving the emitter 18, so that the emitter becomes negative and the collector becomes positive, and therefore current is generated. The emitters and collectors of a power unit therefore serves as a thermionic converter.

The collectors 20 of the converters are grounded to the vessel 12 while the emitters 18 are connected through electrical conductors 20 to a control and output circuit 22. The circuit 22 supplies current to a load 24.

The nuclear fuel generates neutrons, and the density of the generated neutrons determines the amount of heat which is generated and the rate at which the nuclear fuel is used up. The neutron flux is controlled by a series of control drums 26 that are spaced from one another about the reactor vessel 12. Each control drum 26 includes a neutron reflective portion 28 and a nuclear poison portion 30. The reflective portion 28 is constructed of a material such as beryllium which is a good reflector of neutrons. The poison portion 30 contains a material such as boron carbide which readily absorbs neutrons. The neutron flux in the reactor is increased by turning the drum so that more of the reflective portion 28 faces the vessel and less of the poison portion 30 faces it. A control motor 32 which is connected by a transmission (not shown) to all of the drums, rotates the drums in either of two directions to progressively increase or decrease the neutron flux and therefore the heat delivered by the nuclear fuel to the emitters.

The efficiency of operation of the reactor system depends upon the temperature of the emitters 18. Thus, materials such as tungsten are utilized in the emitters to withstand high sustained temperatures such as 1800° C, so that the maximum amount of current can be obtained from a given mass of nuclear fuel. It has been found that the life of the emitters is prolonged by minimizing temperature fluctuations of the emitters. Thus, it is desirable to operate the reactor at a substantially constant high temperature to efficiently utilize the nuclear fuel and promote reliable operation of the reactor.

The reactor system 9 is designed for use on space vehicles to supply electricity for the various devices on board. These electrical loads are subject to wide fluctuations, and some of the load changes cannot be predicted. When the load connected to the thermionic converters changes, so that a different amount of current is drawn, the voltage across the converters will also tend to change, the voltage tending to decrease when the current increases and vice versa. If the converters are merely connected through a constant gain power regulator to the load, then any variation in voltage across the converter units will result in a corresponding change in voltage across the load, which is highly undesirable. The voltage output of the converters can be stabilized by operating the control motor 32 to rotate the drums so that the neutron flux, and therefore the heating of the emitters is adjusted to change the voltage so as to maintain a constant output voltage. However, this results in changes in the temperature of the emitters which, as described above, is undesirable.

In accordance with the present invention a control circuit of the type illustrated in FIG. 3 is utilized to maintain a constant output voltage and to minimize temperature fluctuations of the emitters, all in spite of large and sudden changes in the load 24. The block diagram of FIG. 3 includes a reactor portion 40 which represents the cores 16 of the nuclear fuel in all of the power units. This nuclear fuel or reactor portion 40 generates neutrons and fission products that heat the converter units to generate current. The generated heat is proportional to the neutron density or flux which is represented by the letter $n$. The neutron flux produces heat in the group of thermionic converters which are indicated by blocks 42. Each thermionic converter includes an emitter 18 and collector 20, as described above.

The electrical output of each converter 42 drives a variable gain power regulator 44. Each power regulator 44 may be a DC to DC converter which raises the voltage to a level required by the loads, and which can be made to increase or decrease the voltage gain in accordance with a signal received at a control input 46 thereof. The outputs of the power regulators are connected in parallel across the load 24 to energize it. The reason why many power regulators 44 are provided, is to permit close-to-normal operation even if some of the converters fail or greatly degrade. The complexity of the system can be reduced by using one power regulator for each group of two or more thermionic converters.

In order to maintain a constant output voltage, a voltage sensor 48 is connected across the power regulators 44, and the sensed voltage is delivered to a summing junction 50 along with the output of a reference voltage source 52 that always supplies a predetermined voltage which it is desired to maintain across the load. The difference between the reference voltage and the actual voltage sensed by the sensor 48 produces a signal on the output line 54 of the summing junction 50. The output line 54 is connected to the control inputs 46 of the variable gain power regulators to vary their voltage gains. The power regulators 44 therefore supply a constant output voltage, provided, however, that sufficient current is always available from the converters 42.

The control of the reactor is determined by a portion of the system which is completely separate from the power regulators 44. The reactor control includes current sensors 56 that sense the amount of current $i_a$, $i_b$, $i_c$ etc. supplied by each converter 42 to a corresponding power regulator 44. The outputs of the current sensors 56 are summed by a summing circuit 57, and a signal $i_s$ representing the sum of currents is delivered to a signal generator 58. The generator 58 generates a signal on its output line 60 which is a linear function of the current. Thus, for a given total current $i_s$ flowing from the converter, the output of the signal generator is $a+bi_s$, where $a$ and $b$ are constants for the particular nuclear reactor. The output line 60 of this signal generator is connected to another summing junction 62. Also connected to the summing junction 62 is the output line 64 of a neutron flux sensor 66 that senses the level of neutron flux $n$ in the reactor. An ionization chamber type of neutron detector or other type may be utilized. The output line 68 of the summing junction 62 carries an error signal $s$ which drives the drum control motor 32. The error signal on line 68 may be positive or negative to drive the motor 32 in either of two directions.

There are many sources of emitter cooling in the reactor, including coolant flowing past the power units that cool the collectors which in turn tend to cool the emitters, conduction and radiation losses from the vessel, and current drawn from the converters for supplying the load. The only important cooling source which fluctuates rapidly and to a great extent with fluctuations in electrical load is cooling resulting from current drawn from the converters. The magnitude of cooling change is substantially proportional to the amount of current change. Since the amount of heating of the reactor is substantially proportional to the neutron flux, there is a linear relationship between change in neutron flux and change in current drawn from the converters. Thus, even if the current changes greatly, the change in cooling can be counteracted by a proportional change in neutron flux, to keep the emitters of the reactor at a substantially constant temperature. The circuit of FIG. 3 accomplishes this by controlling the neutron flux $n$ in accordance with a linear function of the current $a+bi$, where $a$ and $b$ are constants and $i$ represents current from one or more of the thermionic converters such as the total current $i_s$. The constants $a$ and $b$ are chosen so that any change in the entire term $a+bi$ (representing heat removed) is counteracted by an equal change in neutron flux $n$ (representing heat applied) so there is a minimum change in emitter temperature. The circuit decreases the neutron flux $n$ when the flux $n$ minus a constant $b$ times the current $i$ exceed a constant $a$.

When the amount of current $i$ increases and the neutron flux $n$ is changed by the apparatus of FIG. 3, the temperature of the reactor will not change greatly because the additional removal of heat by current flow largely equals the additional heat supplied by the neutron flux. The system responds to changes in load because the current output from the converters 42 changes more than proportionately with load. Thus, if the load 24 suddenly increases by 10%, the variable gain power regulator 44 begins to draw more current from the converters 42 in order to supply 10% more current to the load 24 at a constant voltage. The voltage supplied by the converters 42 will initially fall as a result of the increased current being drawn. As a result, the power regulators 44 will have to draw more than 10% additional current in order to supply 10% more power to the load at a constant voltage. This results in a large variation in current, resulting in a large error signal being generated by the summing junction 62 and a large drum movement by the motor 32. The motor 32 drives the neutron flux regulating drums so that the neutron flux will increase by more than 10%. A new operating condition will be achieved wherein more than 10% additional current is drawn from the converters to supply the loads with the required additional power. However, the temperature of the emitters in the converter units will not change greatly. It also may be noted that as the nuclear fuel becomes depleted during reactor operation, or if one or more elements fail, the circuit of this invention automatically adjusts the regulating drums to maintain a high neutron flux for efficient reactor operation.

As described above, in a situation where all reactor thermionic fuel elements or converters have emitter surfaces at constant temperatures, there is a substantially linear relationship between neutron flux (neutrons per unit area) and the electron current out of the converters. Also, as described above, this is defined by:

$$n = a+bi_s$$

In this equation, coefficient $a$ is the reactor neutron flux for zero electrical power output, required by the losses in the system. Such losses include neutron absorption and leakage for control and the thermal radiation losses from the reactor core (to the structure and to the coolant of the converters). The coefficient $b$ is only slightly more than the neutron flux required per unit of electron cooling in the converters. (This includes the heat energy release by neutron collision and the relativistic energy release by fission fragmentation and their secondary collisions.)

One system has been designed for a net electrical output of 120 kilowatts electrical (kWe), with a gross electrical output capability of 180 kWe. The reactor had a nuclear/thermionic core diameter of 480 mm and a length of about 440 mm. Total reactor, including reflectors and containment, was 737 mm diameter and 925 mm in length. Thermal power level was approximately 1000 kilowatts thermal (i.e. 1 megawatt).

Total neutron flux in this reactor is estimated at $1.7 \times 10^{12}$ neutrons per square millimeter per second (n/mm²sec), of which 49 percent is in leakage and non-uranium absorption. The remaining 51 percent is converted to heat. From this, an additional 23 percent goes to zero-power thermal losses, so that the total neutron and thermal losses are approximately 72 percent of the neutron flux just to achieve zero output power. The remainder, which is essentially power-associated, is 28 percent. The 180 kWe reactor output is at a voltage output of approximately 24V. Thus, maximum current out of the converters is approximately 7500 amperes. Since 28 percent of $1.7 \times 10^{12}$ n/mm²sec is $4.8 \times 10^{11}$ n/mm²sec, the coefficient $b$ is approximately $6.4 \times 10^{7}$ n/mm²sec-ampere. The coefficient $a$ is approximately $1.2 \times 10^{12}$ n/mm²sec.

Thus, for a reactor of a size of one megawatt thermal and with a 24 volt output, the constants $a$ and $b$ are of the following order of magnitude.

$a = 10^{12}$ n/mm²sec = neutron flux level required to maintain thermionic temperature for zero electrical power output.

$b = 6 \times 10^{7}$ n/mm²sec-ampere = the increase in neutron flux level required for each ampere of electrical current output.

The constant $a$ remains approximately constant regardless of the size of the reactor. The constant $b$ would vary roughly inversely proportional to the thermal size, or quantity of heat generated, by the reactor, and therefore $b = 6 \times 10^{7}$ n/mm²sec times the reciprocal of the reactor thermal output in megawatts. For a reactor of any size, the equality is:

$$n = 10^{12} \text{n/mm}^2\text{sec} + 6 \times 10^{7} \text{n/mm}^2\text{sec} \times (1/T) \times i_s$$

where $T$ is the thermal output of the reactor in megawatts and $i_s$ is the electrical load in amperes (at 24 volts) drawn from the reactor.

Referring to FIG. 3, the motor 32 which is used to drive the drums can move them rapidly to a new position, such as in less than a second. However, the load 24 can change much faster than the drums can be moved. While the drums are moving, the required power still must be delivered to the power regulators 44 in order to prevent fluctuations in output voltage. The converters 42 can supply a variable power by reason of the energy stored in the form of heat. As a result, the emitters of the converters will drop in temperature when more power is suddenly drawn from them and will rise in temperature when the power suddenly drops. However, before these fluctuations in temperature have progressed very far, the drums will have moved to positions that counteract the change in heat drawn off by reason of change in current, and the temperature fluctuations will be minimized. The power regulators can respond fast enough to load changes to prevent brief spikes of voltage drops even if the load changes suddenly.

Figure 4:
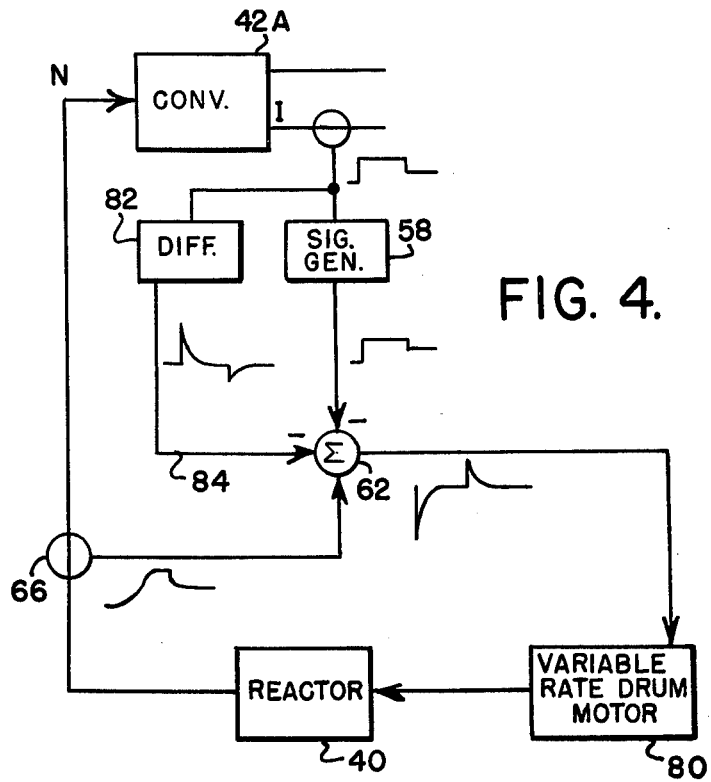
FIG. 4 is a partial block diagram representation of a power system constructed in accordance with another embodiment of the invention.

The motor 32 which drives the drums can be of the type which operates at only one speed or may be of the type which operates at different speeds. FIG. 4 illustrates a system constructed in accordance with another embodiment of the invention which employs a variable rate drum control motor 80 that drives the control drums to a new position at a rate that depends upon the voltage input to the motor. This system is similar to that of FIG. 3 except that a differentiator circuit 82 is provided which delivers a signal on its output 84 to the summing junction 62. The signal on output 84 is a decaying signal which has an initial magnitude dependent upon the amount (rate) of a load change, and which has a polarity that depends upon whether the load is increasing or decreasing. This signal at 84, which is a nonlinear function of current, is added to the signal delivered by the signal generator 58 which is a linear function of the current. The output of the differentiator 82 serves to drive the motor 80 at an initially high rate of speed when there is a sudden change in the load and therefore in the current supplied by the converter 42A. The motor therefore initially moves the drums at a high rate of speed towards a new position, so that the lag in neutron flux is minimized and therefore the emitter temperature does not undergo as great a change as would occur for a lower constant motor speed. The output from the differentiator 82 quickly drops to a low level, so that the motor speed gradually decreases as the control drums approach the required new position. It is possible to utilize a relatively small motor without danger of burning it out because any large voltage applied to it is applied for only a brief period.

Thus, the invention provides a reactor power source which supplies a constant voltage to a variable load, while minimizing temperature fluctuations in the emitters of the reactor system. This is accomplished by utilizing a variable gain power regulator to always maintain a constant output voltage and by using a separate neutron flux regulator which changes the neutron flux as a linear function of the current drawn from the thermionic converters of the reactor. The variable gain power regulator or power regulator means, maintains a constant voltage across the variable load by varying the current it draws from the thermionic converter in an amount more than proportional to variations in the load. This more-than-proportional change in current is used to generate a signal that is used to drive a motor that rapidly changes the neutron flux, and which changes the flux to a new level which results in the required amount of power being delivered to the load while the temperature of the thermionic emitters remains substantially the same. Of course, if the load applied is greater than the reactor can supply, even at maximum neutron flux, then the voltage across the load will have to fall, but up to this point the load voltage will remain constant.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A thermionic nuclear reactor power source comprising:
   a reactor vessel;
   a plurality of spaced apart thermionic nuclear fuel elements in said vessel, each element including emitter means and collector means spaced apart from said emitter means and nuclear fuel means, said nuclear fuel means generating neutrons to heat said emitter means at a controllable neutron flux in said vessel;
   means electrically coupled to said emitter and collector means of said elements for supplying current therefrom to a load;
   control means for controlling the neutron flux in said vessel;
   first means for measuring the neutron flux in said vessel;
   second means for measuring the current generated by at least some of said emitter and collector means; and
   controlling means coupled to said first and second measuring means and responsive to a predetermined function of said measured current and said measured neutron flux for controlling said control means to control the neutron flux in said vessel so as to maintain said emitter means at a relatively constant temperature.

2. The power source described in claim 1 wherein:
   said means for supplying current to a load includes a variable gain power regulator having a pair of output terminals for supplying current to a load and having a control terminal for receiving control signals that vary the voltage gain of the regulator, and means for sensing a load voltage coupled to said control terminal to maintain a constant load voltage; and
   said controlling means is independent of the output of said power regulator.

3. The improvement described in claim 1 wherein:
   said control means includes a plurality of drums disposed about the periphery of said vessel, each of said drums having neutron-reflecting and nonneutron-reflecting portions at different circumferential regions thereof so that the positions of said drums partially determine the neutron flux in said vessel, and motor means for rotating said drums to a plurality of different positions;
   said controlling means includes means for variably energizing said motor means to move it in different directions at different speeds; and including
   means responsive to changes in the measured current for generating a decaying signal of a magnitude dependent upon the rate of current change and of a polarity dependent upon whether the current increases or decreases.

4. In a thermionic nuclear reactor power source which includes a chamber containing spaced apart thermionic nuclear fuel elements, each element including nuclear fuel means and a thermionic converter wirh an emitter and a collector, said nuclear fuel means generating neutrons, electrical conductors coupled to the emitters and collectors to carry electrical power therefrom and means for altering the neutron flux in the chamber, the improvement comprising:
   a neutron flux sensor which generates a signal value $n$ representing the neutron flux in said chamber in neutrons per square millimeter;
   a current sensor which generates a signal value $i$ representing the current in amperes generated by at least one of said emitters and collectors;
   signal generator means for generating a signal value which is a function of the sum of a first selected constant $a$ plus the product of said current $i$ per 24 volts and a second selected constant $b$, where $a$ is on the order of magnitude $10^{12}$ neutrons per square millimeter for each thermal megawatt of the power source and $b$ is on the order of $6 \times 10^7$n/mm²sec times the reciprocal of the thermal megawatts of the power source;

control means having inputs coupled to said neutron flux sensor to receive said signal value $n$ and said signal generating means to receive said signal value $a$ plus $i$ times $b$, and having an output coupled to said neutron flux altering means, for respectively decreasing or increasing the neutron flux in said chamber when the signal value $n-(a+bi)$ generated by said neutron flux sensor is greater or less than zero.

5. The improvement described in claim 4 including:

means responsive to the rate of change of current sensed by said current sensor, for initially driving said flux altering means immediately after a large change in current at greater or lesser speeds dependent upon whether the rate of change of the current was respectively greater or lesser.

6. A thermionic nuclear reactor power source comprising:

a reactor vessel;

a plurality of spaced apart elongated elements, each including thermionic converter means and nuclear fuel means generating neutrons, with the temperature of the emitter elements of said thermionic converters means being a function of the neutron flux in said vessel;

means electrically coupled to said converter means for carrying current therefrom;

a variable gain power regulator means for supplying current to a load at a variable voltage ratio of output voltage to input voltage, said regulator means having a power input coupled to said means for carrying current and means responsive to variations in the output voltage for varying the voltage ratio to maintain a substantially constant predetermined output voltage;

driveable means for altering the neutron flux in said vessel;

means for measuring the neutron flux in said vessel;

means for measuring the current in said current carrying means;

summing circuit means responsive to said flux and current measuring means for generating a signal $s$, where $s = n - (a + bi)$, and where $n$ equals the amplitude of the measured neutron flux in neutrons per square millimeter, $i$ equals the measured current in amperes per 24 volts, and $a$ and $b$ are each selected constants;

the constant $a$ being on the order of magnitude of $10^{12}$ neutrons per square millimeter per second, and $b$ being on the order of magnitude of $6 \times 10^7$ neutrons per square millimeter per second per ampere times the reciprocal of the thermal output in megawatts of said converter means; and driveable means for altering the neutron flux in said vessel to respectively decrease or increase the flux in said vessel when $s$ is greater or less than zero.

* * * * *